Oct. 13, 1953     A. A. BENSON     2,655,237
BRAKE CONSTRUCTION
Filed Aug. 1, 1946     4 Sheets-Sheet 1
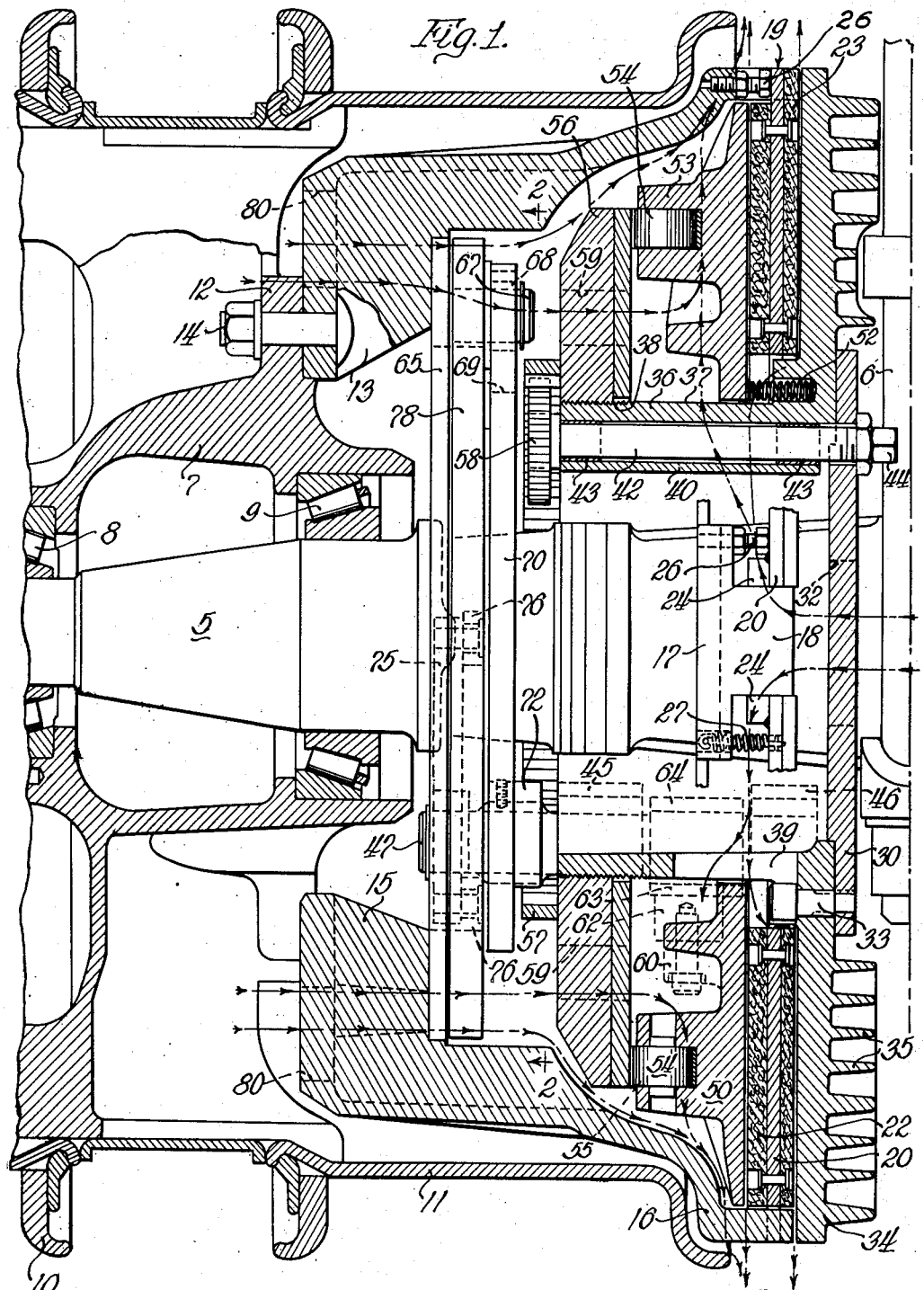
Inventor
Arry A. Benson
By Walter E. Schimer Atty.

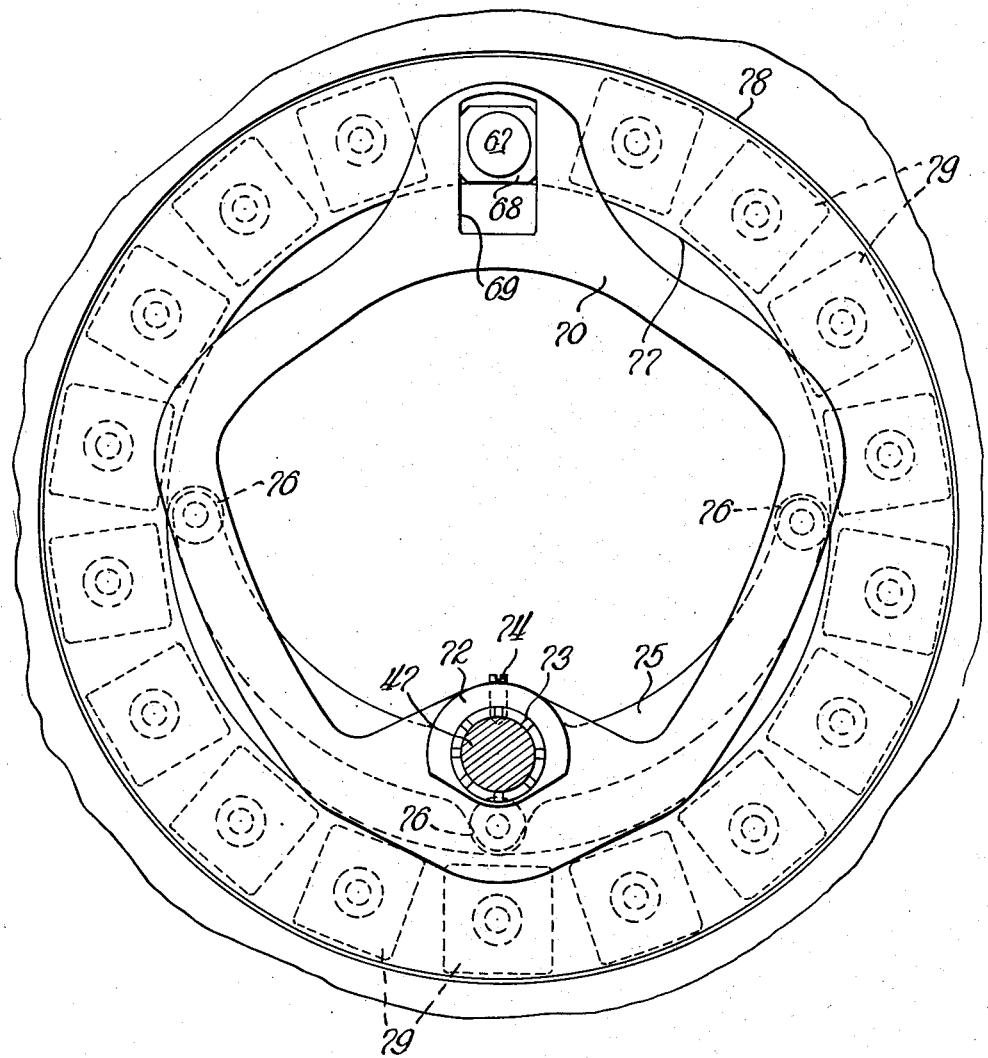
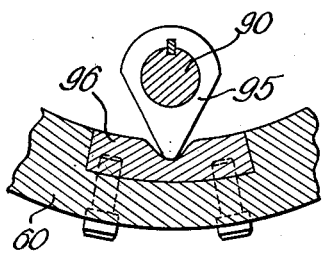

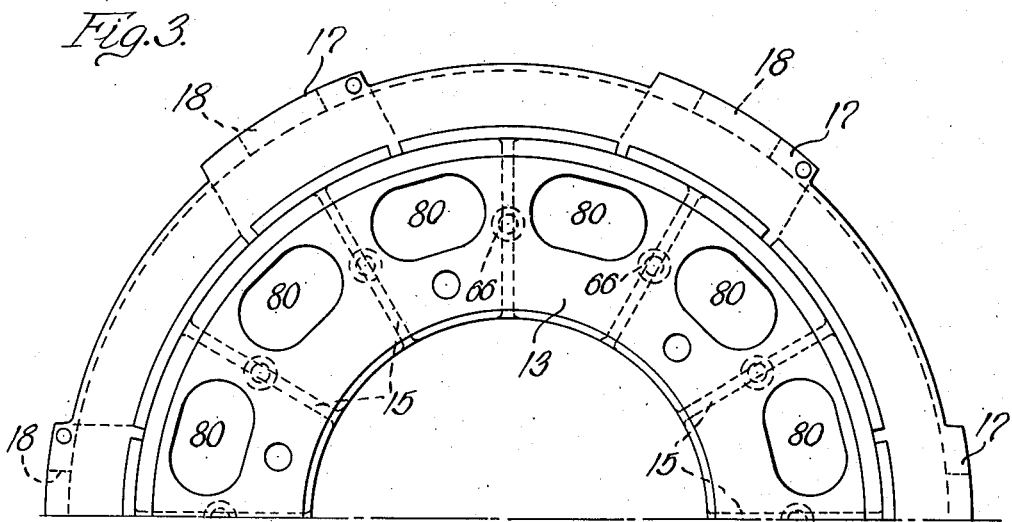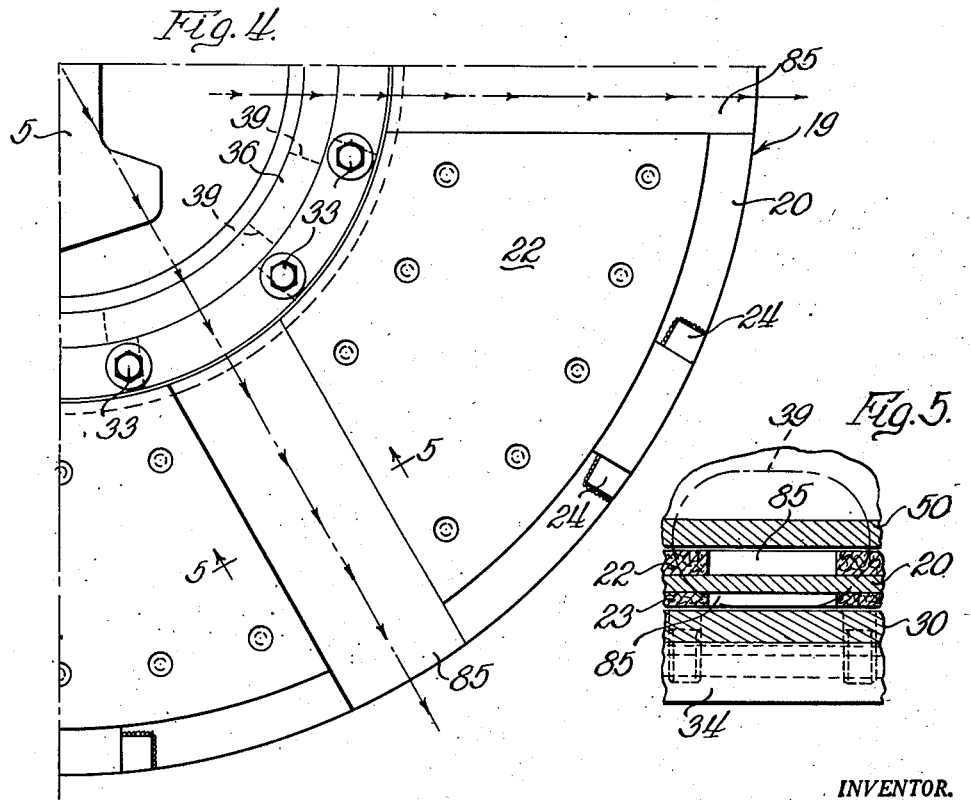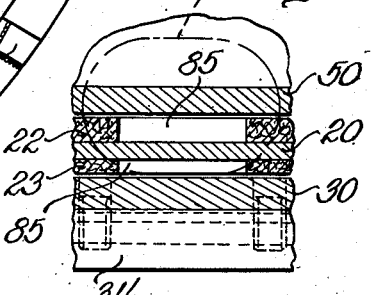

Oct. 13, 1953          A. A. BENSON          2,655,237
                      BRAKE CONSTRUCTION
Filed Aug. 1, 1946                    4 Sheets—Sheet 4
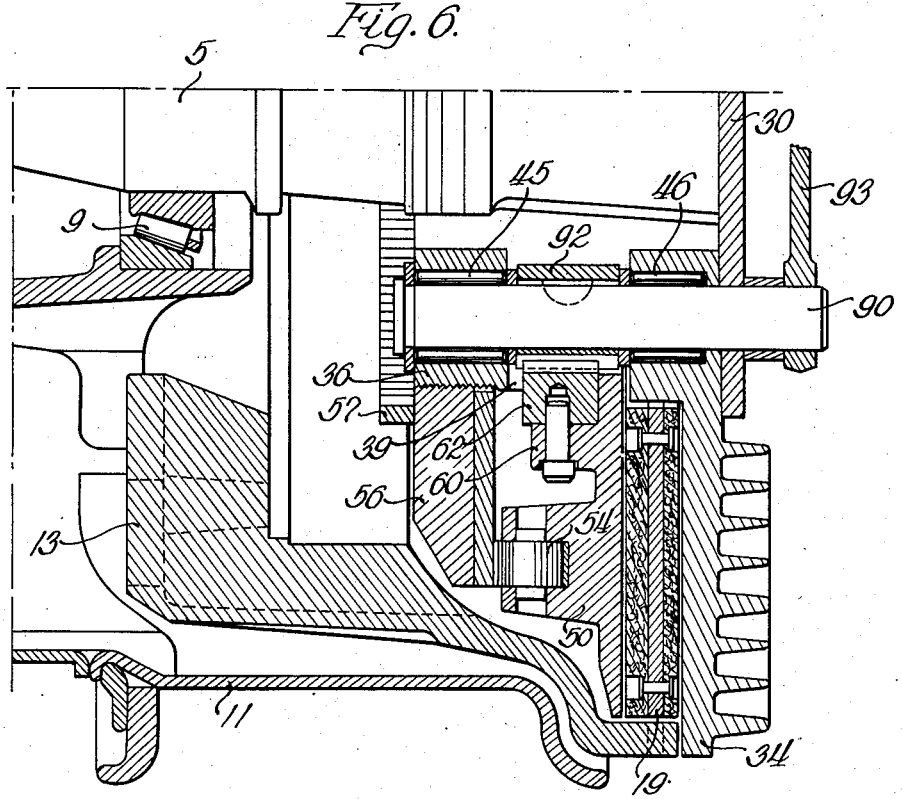
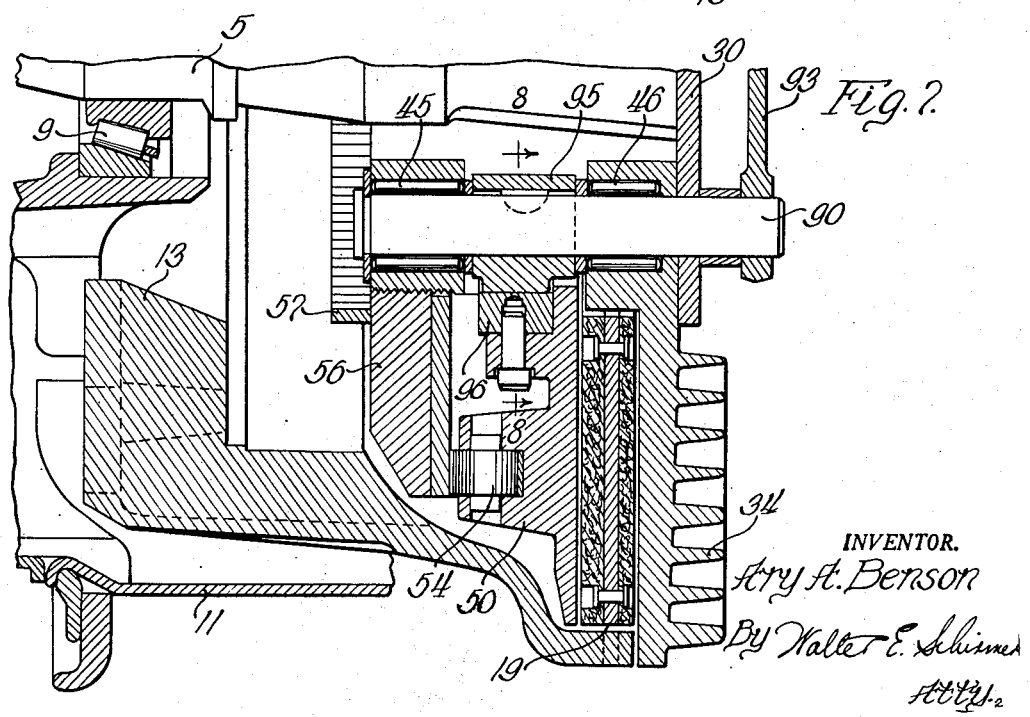
INVENTOR.
Ary A. Benson
By Walter E. Schirmer
Atty.

Patented Oct. 13, 1953

2,655,237

UNITED STATES PATENT OFFICE 2,655,237

BRAKE CONSTRUCTION

Ary A. Benson, Detroit, Mich.

Application August 1, 1946, Serial No. 687,571

4 Claims. (Cl. 188—264)

This invention relates to brake constructions, and more particularly is directed to a wheel assembly and brake construction for use on trailers, trucks, buses and similar vehicles where it is necessary to provide ample braking capacity for braking such vehicles at high speed, and also where it is desirable that the mechanism be so disposed and arranged that the heat generated during the braking operation be rapidly dissipated preferably at a point remote from the rims.

One of the primary objects of the present invention is to provide a brake assembly of this type, which is relatively simple, and in which in place of the conventional drum and expanding shoe type brake, a radial disc type brake mechanism is employed, similar in some respects to that disclosed in my copending application, Serial No. 543,693, filed July 6, 1944, now Patent No. 2,422,713, issued June 6, 1947, although the present application involves considerable change and modification over said aforesaid copending application.

Another feature of the present invention is to provide for adjustment of the clearance between the brake disc and the braking members which can be readily adjusted from a point disposed externally of the brake assembly.

Another object of the present invention is to provide a construction in which free circulation of air to the braking members and adjacent brake surfaces is provided from both the outboard side of the brake assembly and from the inboard side thereof, the assembly being so arranged as to generate air circulation therethrough during operation of the vehicle.

A still further advantage secured by the present invention is the provision of a construction wherein the actuation of the brake mechanism can be electrically controlled, thereby eliminating the necessity of either fluid or air pressure lines to a brake actuating cylinder and consequent mechanical actuation therebeyond to the brake assembly.

In a modified form of the invention, I have also provided for actuation of the brake mechanism either by a hydraulically controlled actuating mechanism or an air pressure or booster type brake system with an actuating shaft projecting beyond the inboard side of the assembly.

A still further advantage of the present construction is the provision of a construction which can be equally well adapted to the use of a brake assembly on either a trailing or dead type axle, or on a driving axle. In the former case, the mechanism can be secured about the extending axle spindle upon which the wheel assembly rotates, and, in the latter case, the assembly may be mounted upon the axle housing arm through which the driveshaft for the axle assembly extends.

It is also contemplated in the present construction to use a double-faced friction disc type brake in which both faces of the brake assembly cooperate to provide a greatly increased braking area or surface, and in which provision is made for the passage of air through such braking surface and over the surface thereof to provide adequate cooling of such brake mechanism. In addition, the present construction, by the use of a novel type of reinforced or webbed spider, produces a fan effect which draws air in from the outboard side of the wheel and forces it into the brake assembly, the air being discharged about the exterior peripheral surface of the friction disc. At the same time, air is admitted from the inboard side of the brake assembly and directed outwardly through such assembly past the friction disc surfaces to provide for cooling thereof.

Other objects and advantages of the present invention will appear more fully from the following detailed description, which, taken in conjunction with the accompanying drawings, will disclose to those skilled in the art the particular construction and operation of a preferred form of the present invention.

In the drawings:

Figure 1 is a sectional view with portions shown out of position illustrating the general brake combination;

Figure 2 is a vertical sectional view taken substantially on line 2—2 of Figure 1, illustrating in detail the magnetic actuation of the brake mechanism;

Figure 3 is an elevational view of a portion of the spider which carries the brake disc;

Figure 4 is an elevational view of a portion of the friction disc construction illustrating the manner in which air is circulated therethrough;

Figure 5 is a detail sectional view taken on line 5—5 of Figure 4;

Figure 6 is a detail view of a modified form of actuating mechanism for the brake assembly;

Figure 7 is a detail sectional view of a still further modified form of actuating assembly; and Figure 8 is a detail sectional view taken substantially on line 8—8 of Figure 7.

Referring now in detail to the drawings, in Figure 1 there is disclosed an axle spindle or arm member 5 which is provided with the usual spring clips 6 by which a leaf spring assembly is supported upon the axle arm for supporting a vehicle body thereon.

Suitably journalled upon the extending end of the axle arm is a wheel spider 7 supported as by means of the tapered bearing assemblies 8 and 9, and carrying at its outer end two tire supporting rims 10 and 11. The rims 10 and 11 are demountably mounted upon the extending spoke ends of the spider 7, and the spider is provided at peripherally spaced intervals with boss portions 12 which are machined to provide a pilot surface upon which is mounted the spider member 13, this member being secured in position by means of a peripheral series of bolts 14 extending through the bosses 12. The spider 13, as shown more in detail in Figures 1 and 3, is preferably formed of aluminum and has radially extending rib portions 15 forming a reinforcement between the radially inwardly extending flanged portion of the spider and the axially extending overhanging portion thereof. The spider projects inwardly from the bosses 12 to a point beyond the inboard edge of the inner rim 11 and adjacent this point is radially enlarged as indicated at 16 and provided with axially extending finger portions 17 shown in detail in Figure 3. The finger portions 17 have projecting lugs 18 disclosed in elevation in the central portion of Figure 1, which extend into suitably notched peripheral portions of the friction disc indicated generally at 19. The lugs 18 are formed integral with the spider member 13, and provide a means for non-rotatably securing the friction disc, generally indicated at 19, for conjoint rotation with the spider 13. It will be noted the friction disc 19 is composed of an intermediate steel member or disc 20, as shown in detail in Figure 5, and adjacent friction surfaces 22 and 23 riveted or otherwise suitably secured to the disc 20, these surfaces preferably being of an asbestos type friction brake material. Each of the lugs 18 extends between a notched portion in the plate 20, which notched portion is provided with side lugs 24 welded or otherwise suitably secured thereto to reinforce that portion of the disc 20 which is notched and to prevent shearing of the lugs 18.

The extending portion 17 at the peripheral edge of the spider 13 is adapted to carry an adjusting nut 26, which nut provides for a predetermined spacing between the spider periphery and the disc 20, the nut being adjustably threaded into the boss portion 17 of the spider. On the opposite side of the lug 18 the boss portion 17 is provided with a suitable pin means for securing a coiled tension spring 27 therein, the opposite end of the spring being secured in the steel disc 20 whereby the disc is resiliently held in position against the stop nut 26, thereby providing a predetermined positioning or spacing of the disc 20 relative to the peripheral edge of the spider 13 and providing for retraction of the disc to this position after energization and subsequent release of the brake assembly.

It will be seen that with this construction the friction disc assembly 19 is floatingly supported in position by the projecting lugs or bosses 17 of the spider 13, and rotates conjointly therewith, although having limited axial movement relative to the spider.

Secured about the axle spindle 5 adjacent the spring supporting pads or clips 6 is a flange member 30 which is non-rotatably secured to the axle assembly, and is preferably provided with openings 32 spaced circumferentially thereabout to provide for air entrance thereinto.

Adjacent its periphery, the flange member 30 is provided with studs 33 by which is secured to the periphery of the flange member a pressure plate 34, this plate being preferably finned on its inboard surface, as indicated at 35, to provide for rapid heat dissipation therefrom. The opposite face of the plate 34 is adapted to be engaged by the surface 23 of the friction disc assembly when this assembly is actuated for braking operation.

The plate 34 is also provided with an integral hub portion 36, projecting axially outwardly from the inner periphery thereof and radially spaced about the axle spindle 5. This hub portion preferably is provided with a smooth annular surface 37 which is threaded adjacent its outer end as indicated at 38.

At spaced intervals about the periphery of the hub portion 36 there are provided openings 39 forming radial ports through which air may pass into the inner peripheral surface of the friction disc 19 and also into other portions of the assembly, which will be described in detail hereinafter.

The hub portion 36 at one point in its internal surface is provided with a boss portion 40 which is suitably bored to provide for receiving an adjusting shaft 42, this shaft being carried in suitable bushings 43 pressed into opposite ends of the bore within the boss 40. The shaft 42 projects through a suitable opening in the brake supporting plate 30, and at its outer end is formed, as indicated at 44, to receive a suitable wrench for rotating the shaft in either direction. At a point opposite to the boss portion 40 of the hub 36 of the plate member 34 there is provided axially spaced bosses 45 and 46 formed integral with the hub portion 36 which are adapted to receive suitable bearing assemblies (not shown) whereby an actuating shaft 47 is rotatably secured within the hub 36 of the pressure plate or stationary plate 34.

Mounted for free axial movement about the hub 36 of the plate member 34 is a secondary movable pressure plate indicated generally at 50, which plate is adapted under normal conditions to have slight clearance with respect to the brake surface 22 of the friction disc assembly 19, this clearance being provided by suitable spring members 52 which are biased between stationary plate 34 and the movable plate 50, and normally urge the plate 50 in a direction away from the plate 34. The plate member 50 is provided with rearwardly extending boss portions 53, which are suitably recessed to receive cam rollers 54, these cam rollers extending in suitable slots or camways in the rear face of the plate 50 and also projecting into suitable camways 55 of a backing plate or support plate 56. The plate 56 which forms a fixed support or reaction member for the rollers 54 is threaded over the end of the hub portion 36 upon the threads 38, and the cam rollers 54 provide for axial movement of the plate 50 away from the plate 56 when the plate 50 tends to rotate relative to the plate 56.

In order to provide proper adjustment for the clearance between the friction disc and the plate 50, the reaction member 56 is provided on its outboard surface with an internal ring gear member 57 which may be welded or otherwise suitably secured thereon, and which is adapted to be engaged by a pinion 58, the pinion 58 being carried on the end of the adjusting shaft 42. Thus, it will be apparent that by suitable rotation of the shaft 42 from the end 44 thereof, the pinion 58 will adjust the axial position of the reaction member 56 relative to the friction disc assembly 19 so as to space the pressure plate 50 the proper distance with respect to the friction surface 22.

It will be noted that the reaction member 56 is provided at circumferentially spaced points with openings 59, which openings extend axially therethrough and provide for flow of air through this member.

The plate member 50 is provided with a boss portion (not shown in proper location in Figure 1), located adjacent to and intermediate bosses 45 and 46, indicated generally at 60, in which is mounted a rack member 62, the rack member having rack teeth 63 adapted to be engaged by a pinion 64 mounted upon the actuating shaft 47 intermediate the bearing assemblies 45 and 46. Consequently, upon rotation of the pinion 64, the rack 63 will be actuated to rotate the disc 50 in one or the other direction, thereby causing the roller members 54 to roll up the camways on the members 50 and 56, tending to force the plate 50 axially away from the plate 56. This slight rotative action therefore forces the plate member 50 into contact with the friction surface 22 of the friction disc assembly 19. As a result, the member 50 is still further rotated, producing a further axial thrust thereon, and forcing the friction disc assembly itself axially to the right, as viewed in Figure 1, causing the opposite friction surface 23 to move into engagement with the stationary face of the plate member 34. Thus, the friction disc assembly 19 is frictionally clamped between the plates 50 and 34 to produce the braking effort.

To produce rotation of the actuating shaft 47, there is disclosed in Figures 1 and 2 a novel type of actuating mechanism. In this form of the invention there is a plate member 65 secured rigidly to the inboard ribs of the spider 13, as by means of suitable studs illustrated at 66 in Figure 3.

At the extending end of the adjusting shaft 47 there is provided a cradle member, shown in more detail in Figure 2 and indicated generally by the reference numeral 75, which cradle is rotatably journalled on the shaft 47, and is provided with three extending roller members 76 rotatably carried by the cradle arm or member 75. The rollers 76 are adapted to engage the internal peripheral surface 77 of a magnetic ring member 78, whereby the ring member 78 is held in coaxial position with the plate member 65 by means of its support upon the roller members. The magnetic ring member 78 is provided with a series of individually wound magnetic coils 79, each of these coils being secured in a suitable recess in the face of the member 78 adjacent the plate 65. The coils are all suitably connected through common conductors to a source of electrical energy so that when energized the magnetic ring 78 tends to rotate conjointly with the plate 65 carried by the spider 13. The magnet members 79 may be of any standard type, and preferably are provided with frictional surfaces closely juxtaposed to the surface of the plate member 65. The magnet ring 78 also is adapted to carry an extending pin 67 projecting inwardly toward the plate or reaction member 66. The pin 67 carries a rotatably mounted square nut 68 adapted to operate in a rectangular slot 69 of an actuating arm indicated generally at 70.

The actuating arm 70 adjacent its lower end is provided with a boss portion 72 which has a splined fit upon an enlarged splined portion 73 of the actuating shaft 47, there being a suitable set screw 74 for locking the hub portion 72 of the actuating arm 70 in position on the splined portion 73 of the actuating shaft. From this construction, it will be apparent that when the magnets 79 are energized and the ring 78 tends to rotate conjointly with the plate 65, the pin 67 tends to move in an arc about the axis of shaft 47. However, additional movement of the arm 70 results in a rotation of the shaft 47 due to the splined connection of the lower end of the arm thereto, resulting in rotation of this shaft and consequent rotation of pinion 64 which rotates plate 50, thereby energizing the brake assembly as previously described.

The assembly is returned to inoperative position after a braking operation by means of springs 52, the springs 27, and the fact that the plate 50 reversely rotates until the rollers 54 are centered in their camways, thereby causing the shaft 47 to again assume the position shown in Figure 2, which, in turn, centers the entire mechanism including the magnetic ring.

The present invention contemplates a complete ventilation of the entire brake assembly to dissipate all heat generated therein during a braking operation. For this purpose it will be noted that the spider member 13 is provided with a series of elongated openings 80 formed in the radial flange portion thereof and so arranged as to receive air, as indicated by the arrows in Figure 1, between the spokes of the wheel spider 7, this air passing through the openings 80 and through the spaces between the ribs 15 of the spider, and thence through suitable openings formed in the plate 65, which plate it will be noted constitutes only an annular ring or disc having the center portion thereof open, past the magnetic ring 78 and the arms 70 and 75, with a portion of this air then passing outwardly over the peripheral portion of the reaction member 56 and out past the periphery of the spider 13. Another portion of this air is directed through the openings 59 in the reaction member and thence upwardly or radially outwardly past the rear face of the plate member 50, as shown by the arrows in Figure 1. It will be apparent that the rib portions 15 of the spider member, together with the spokes of the wheel spider 7, tend to act as fans or blades for initiating this movement of the air axially through the spider member and then radially outwardly past the peripheral portion of the spider where it joins the friction disc assembly.

Similarly, air from the inboard side of the brake assembly is drawn axially through the series of openings 32 in the flange 30, and thence moves radially outwardly through the openings 39 in the hub portion 36 of the plate member 34, and thence radially past the outer surface of the actuating plate or pressure plate 50 and also between the pressure plate 50 and the stationary plate 34. The air that moves past the friction surfaces 22 and 23 when the brake is released, and moves radially through these friction surfaces when the brake is energized, as will be noted in detail in Figure 4. It will be noted from this form of the invention that the friction surfaces 22 are interrupted by radial channels 85. These radial channels 85 define therebetween the segments of friction material 22 and 23 whereby radial air passageways between the respective segments are provided from the inner end of the disc outwardly. The disc 20, of course, separates the radial channels between the opposed friction surfaces 22 and 23.

It will be readily seen from Figure 5 the air passing through the openings 39 in the hub portion 36 of the member 34 passes out through the radial openings, and thence radially outwardly beyond the peripheral edge of the friction disc assembly 19. Thus, it is apparent that air from both the outboard and inboard sides of the brake assembly is drawn centrally thereinto by the rotating action of the elements of such assembly, and is discharged over the pressure plate and the braking surfaces to carry therewith and dissipate into the surrounding atmosphere the heat generated during the braking operation.

It is also to be noted that a certain portion of this air can pass through the assembly even when the brake is energized, thereby providing for additional cooling when the brakes are applied for a period of time; such as, when coming down a mountain or under similar conditions.

In Figure 6 I have disclosed a modified form of construction in which the main elements of the combination remain the same, but in place of using the magnetic actuating mechanism for energizing the brake assembly I use in lieu thereof an air pressure or fluid pressure operated system connected with a mechanical diaphragm control actuator. In Figure 6, for example, the actuating shaft 90 terminates at a point adjacent the inner end of the hub portion 36 of the stationary plate 34 and, while it projects through the two bearing assemblies 45 and 46 similar to the manner in which the shaft 47 was supported, which bosses or bearing assemblies rotatably support the short shaft 90 therein, the end of the shaft terminates adjacent the rear end of the reaction member 56. Intermediate the bearing assemblies, the shaft 90 is provided with the pinion gear 92 fixedly secured thereon, and, at its inner end the shaft is provided with an actuating arm 93 which is connected through suitable linkage to a diaphragm in the case of booster type air brakes, or to any other suitable brake actuating mechanism.

Thus, when the shaft 90 is rotated by means of the arm 93, the pinion 92 is adapted to correspondingly rock the rack member 62 to effect rotation of the plate member 50 which thereupon moves axially toward the stationary plate 34 due to the action of the cams or rollers 54. In the use of this type of embodiment, of course, the magnetic ring and the arms 70 and 75 are eliminated, as well as the plate 65 since the operation is from the opposite end of the actuating shaft.

If desired, the brake mechanism can be actuated in a manner as shown in Figure 7. In this case, the pinion 92 is replaced by a cam member 95, as shown in detail in Figure 8, the cam member 95 operating within a wedge 96 secured to the boss 60 of the plate member 50 in place of the rack 62. The wedge 96, of course, is keyed in any suitable manner to the shaft 90 to provide for conjoint rotation therebetween. In all other respects, the mounting of the shaft 90 is similar to that described in connection with Figure 6, and the operation of the mechanism is substantially the same. The details of the manner in which the cam is shaped to fit within the wedge 96 is shown in Figure 8, and it is apparent that slight rotation of the shaft 90 in either direction will result in a rotation of the plate member 50, and, because of the rollers 54, will cause axial shifting of the plate 50 to engage the brake disc between the plate 50 and the stationary plate 34. It is to be understood that in the modified form of the invention shown in Figures 6 and 7, the same type of ventilating will be employed to provide adequate dissipation of the heat generated during the braking action.

I am aware that various changes may be made in certain details of the construction herein shown and described without in any way departing from the scope and spirit of the present invention, and I therefore do not intend to be limited except as defined by the appended claims.

I claim:

1. In a brake construction, a fixed pressure plate, an axially shiftable pressure plate and a friction plate between said pressure plates, said plates being parallel and in coaxial alignment, a central fixed hub coaxial with said pressure plates and around which said friction plate is rotatable, radially directed openings in said hub for passage of air from within said hub to said friction plate, and radially extending channels in said friction plate for receiving air from said openings and for discharging it radially outwardly at the periphery of said friction plate upon rotation of the latter, and means supporting said friction plate for rotation about said hub, axially directed openings formed in said fixed pressure plate for admitting atmospheric air into said hub for passage through said openings in the latter.

2. In a brake construction, a fixed pressure plate, an axially shiftable pressure plate and a friction plate between said pressure plates, said plates being parallel and in coaxial alignment, a central fixed hub coaxial with said pressure plates and around which said friction plate is rotatable, radially directed openings formed in said hub for passage of air from within said hub to said friction plate, and radially extending channels in said friction plate for receiving air from said openings and for discharging it radially outwardly at the periphery of said friction plate upon rotation of the latter, and means supporting said friction plate for rotation about said hub, said means supporting said friction plate including a rotatable wheel coaxial with said hub having radially directed ribs radially inwardly of the periphery of said wheel and axially directed openings in said wheel at one of the ends of said ribs for admitting air to the spaces between said ribs, the opposite ends of said ribs being adjacent said shiftable pressure plate whereby air will be drawn through the axially directed openings in said wheel for movement to said movable pressure plate upon rotation of said wheel.

3. In a brake construction, a fixed pressure plate, an axially shiftable pressure plate and a friction plate between said pressure plate all being parallel and in coaxial alignment, means supporting said plates in said coaxial alignment, a wheel adjacent said shiftable pressure plate formed with an axially projecting portion having ribs extending radially inwardly therefrom into said wheel and longitudinally of said axis to a point adjacent the periphery of said plates providing a suction-blower adapted to blow air against and past said pressure plate upon rotation of said wheel, means providing an annular air outlet around and positioned radially outwardly of said shiftable pressure plate and said friction plate for discharge of said air.

4. In a brake construction, a fixed pressure plate, an axially shiftable pressure plate and a friction plate between said pressure plate all being parallel and in coaxial alignment, means supporting said plates in said coaxial alignment, a wheel adjacent said shiftable pressure plate formed with an axially projecting portion having ribs extending radially inwardly therefrom into said wheel and longitudinally of said axis to a point adjacent the periphery of said plates providing a suction-blower adapted to blow air against and past said pressure plate upon rotation of said wheel, means providing an annular air outlet around and positioned radially outwardly of said shiftable pressure plate and said friction plate for discharge of said air, said last mentioned means including an axial extension on said wheel extending over the outer edges of said shiftable pressure plate and the peripheral portion of said fixed pressure plate, said extension and said portion being spaced apart and defining opposite edges of said annular outlet.

ARY A. BENSON.

References Cited in the file of this patent

UNITED STATES PATENTS

| Number | Name | Date |
| --- | --- | --- |
| 1,707,843 | Byerlein | Apr. 2, 1929 |
| 1,709,550 | Wilson | Apr. 16, 1929 |
| 1,924,060 | Huck | Aug. 22, 1933 |
| 2,063,443 | Lambert | Dec. 8, 1936 |
| 2,071,107 | Blatt | Feb. 16, 1937 |
| 2,238,943 | McCune et al. | Apr. 22, 1941 |
| 2,262,709 | Lambert | Nov. 11, 1941 |
| 2,279,274 | Johnson | Apr. 7, 1942 |
| 2,304,774 | Ash | Dec. 15, 1942 |
| 2,312,159 | Gulotta | Feb. 23, 1943 |
| 2,317,599 | Freer | Apr. 27, 1943 |